3,111,969
PORTABLE UNDERCUTTING SAW
Arnold R. Bivens, 4314 Acorn St., Charlotte, N.C.
Filed Feb. 5, 1962, Ser. No. 171,129
2 Claims. (Cl. 143—43)

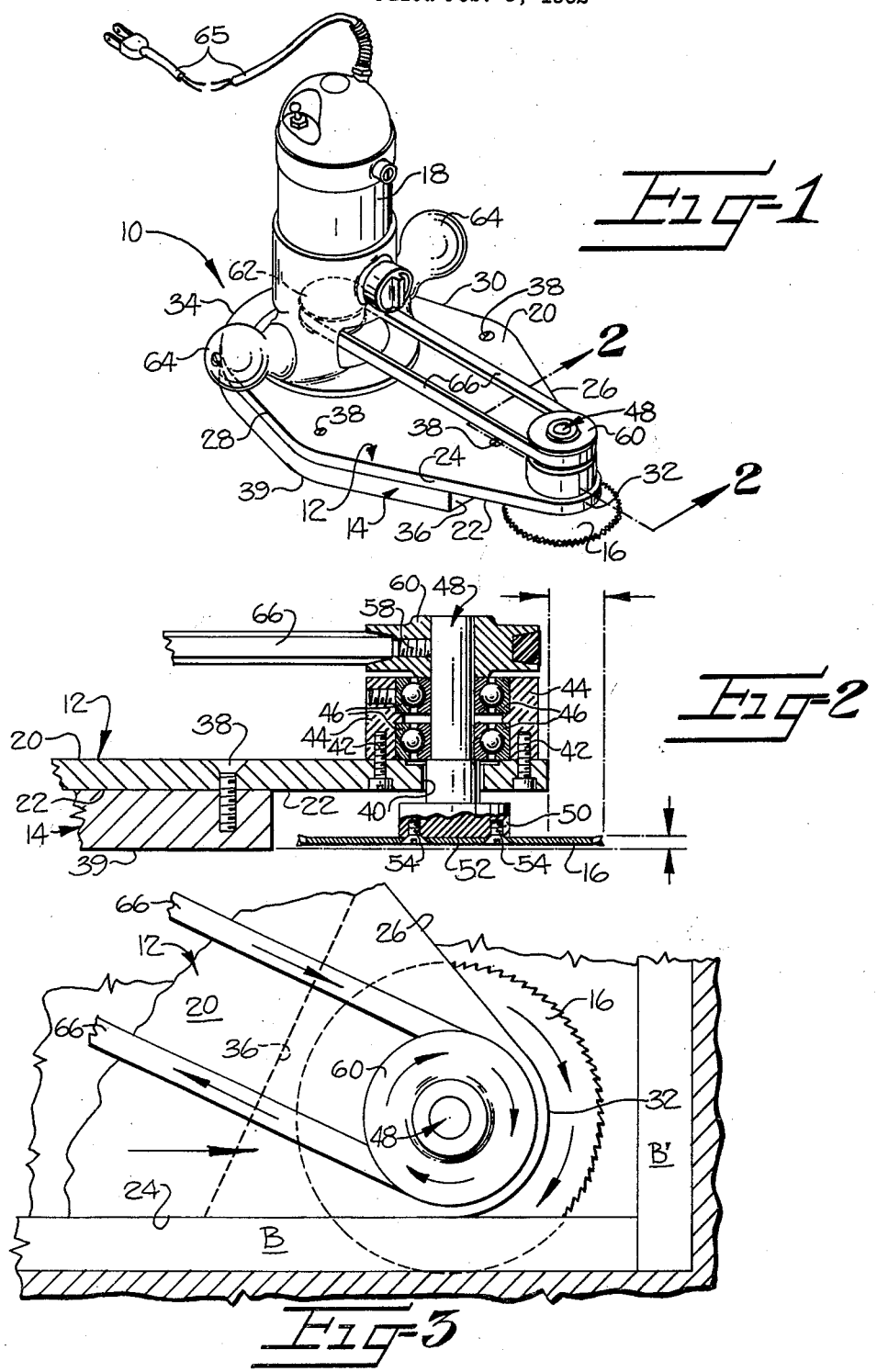

This invention relates to portable saws and, more particularly, to an improved portable saw of the type adapted to facilitate the installation of carpeting, tile, linoleum and other such coverings by undercutting and/or routing away the lower surface of baseboards, moldings, door frames and similar woodwork located adjacent to the floor, countertop or the like upon which the covering is to be installed.

Among the objects of this invention is the provision of a portable saw of the type described that possesses an enhanced versatility of utilization, and which can be utilized with greater speed and facility in corners, cabinets and other confined or obstructed areas by reason of the novel design and relative placement of its various components.

A related and more specific object of this invention is the provision in a portable saw of the type described of guide means which permit the angular position of the saw relative to the woodwork being undercut to be varied as desired over a wide range without interruption of the operation of the saw and without varying its depth of cut, such that the saw can be readily manipulated and operated in confined areas and about obstructions.

Another related and more specific object is the provision of a portable undercutting saw that has a greater stability and that is more readily positionable in corners, cabinets and other confined areas by reason of the cutting element and power source of the saw being mounted in spaced, laterally offset relation relative to each other.

A further object is the provision of a portable saw of the type described that is of exceedingly simple and economical construction, yet which is highly efficient and versatile in operation.

Still other objects and advantages of the invention will be in part evident and in part pointed out hereinafter in the following description of an illustrative embodiment of the invention, which should be read in conjunction with the accompanying drawings, in which—

FIGURE 1 is a perspective view of the improved portable saw;

FIGURE 2 is an enlarged fragmentary vertical section taken substantially along line 2—2 of FIGURE 1 and illustrating the preferred relationship between the cutting element of the saw and the woodwork to be undercut, such woodwork being shown in phantom lines; and FIGURE 3 is an enlarged fragmentary plan view of the cutting element and adjacent components of the portable saw operating in a confined corner area defined by the right angle intersection of two baseboards located adjacent a floor.

Referring more particularly to the drawings, the portable saw identified in its entirety in FIGURE 1 by the numeral 10 includes generally a main support plate 12, a base plate 14, a cutting element in the form of a circular saw blade 16, and power means in the form of an electric motor 18. The attitude of saw 10 illustrated in FIGURE 1 is that which it normally occupies while in operation, and the occasional use subsequently herein of terms such as "upwardly" and "laterally" should therefore be construed with reference thereto. These terms, however, are employed merely to facilitate a description of saw 10, and are not intended to imply that the saw is incapable of being used in attitudes other than that shown.

As shown in FIGURE 1, support plate 12 is approximately diamond-shaped, and has an upper face 20, lower face 22, and side edges 24, 26, 28 and 30. The leading or forwardmost end 32 of support plate 12 is of arcuate configuration, with the center of curvature thereof lying upon the longitudinal axis of the support plate. Side edges 24, 26 of support plate 12 converge inwardly toward and merge tangentially with arcuate end 32, the angle defined between these side edges preferably being approximately 50 degrees, as shown. While not imperative, it is desirable that end 34 of support plate 14 opposite arcuate end 32, and the angles defined by the juncture of sides 24, 28 and 26, 30, also be rounded, as shown, to discourage marring of woodwork which they might contact while saw 10 is in operation.

Base plate 14 differs in shape from support plate 12 only in that the leading or forwardmost end thereof is truncated or foreshortened, terminating in a leading edge 36 extending substantially normal to its longitudinal axis. By virtue of this difference in shape, when support plate 12 is mounted in cantilever fashion upon base plate 14 with end 34 of the former in vertical alinement with the correspondingly shaped end of the latter, arcuate end 32 of support plate 12 is laterally offset, in a forward direction, from edge 36 of base plate 14. Screws 38, or other suitable and preferably detachable fasteners secure plates 12, 14 rigidly together. As shown in FIGURE 2, screws 38 do not project completely through base plate 14, it being desirable that lower surface 39 thereof be smooth and uninterrupted so as to avoid marring of the floor upon which it is positioned when saw 10 is in use.

A vertical bore 40 extends through support plate 12 adjacent its arcuate end 32, the longitudinal axis of this bore passing directly through the center of curvature of end 32. Secured by screws 42 to the upper face 20 of support plate 12 is a tubular sleeve 44, within which a pair of bearings 46 are mounted in axial alinement with bore 40. Extending axially through bore 40 and bearings 46, and rotatably mounted by the latter, is a spindle 48 having an enlarged diameter lower end portion 50 terminating in a planar face 52 disposed parallel to and slightly above the plane of lower surface 39 of base plate 14. The upper end portion of spindle 48 projects beyond bearings 46 and has fixedly secured thereto, as by means of a set screw 58, a sheave 60. Flexible belting 66 extending longitudinally of support plate 12 interconnects sheave 60 with a similar sheave 62 carried upon the output shaft of electric motor 18, which motor is mounted upon upper face 20 of plate 12 adjacent end 34 thereof. The mounting of motor 18 in distal, laterally spaced relation to spindle 48 and immediately above base plate 14 is deemed, for reasons discussed hereinafter, to contribute significantly to the facility and success of operation of saw 10. Motor 18 is provided with handles 64 thereon, by use of which saw 10 is manipulated when in operation, and with a conventional cord 65 adapted to be connected to an electrical outlet.

When cord 65 is so connected and motor 18 is in operation, the resulting rotative movement of its sheave 62 is transmitted by belting 66 to sheave 60, all in a well known manner, and from the latter to spindle 48.

This rotative movement is, in turn, transmitted to the cutting element or circular saw blade 16 of saw 10, which is detachably secured to lower face 52 of spindle 48 by detachable fasteners such as the screws 54 shown in FIGURE 2. As shown, the slotted heads of screws 54 are recessed or countersunk so as to obviate the possibility of their contacting and possibly marring the floor or the like upon which saw 10 is positioned when in use, which marring might otherwise occur due to the fact that the saw blade 16 extends closely adjacent the plane of lower surface 39 of base plate 14.

The maximum diameter blade that can be employed in saw 10, by securing the same to spindle 48, is limited only by the requirement that some clearance remain between the teeth upon its periphery and edge 36 of base plate 14. Blades of considerable and widely varying diameter can therefore be employed. For each particular utilization of saw 10, however, the saw blade selected should have a radial length exceeding the length of the radius of curvature of arcuate end 32 of support plate 12 by a distance equal to the desired depth of cut to be made. Since it is usually desirable to undercut the baseboard or other woodwork to the greatest possible extent, this distance in most instances will be equal to the thickness of the baseboard or other woodwork. This relationship is illustrated in FIGURES 2 and 3, the radial length of the circular saw blade 16 there shown exceeding the length of the radius of curvature of arcuate end 32 of support plate 12 by a distance approximately equal to the thickness of the baseboard to be undercut. When this relationship is observed, it will be apparent that the baseboard or other woodwork will be undercut to the desired depth so long as either arcuate end 32, side edge 24 or side edge 26 of support plate 12 is maintained in abutment therewith, since that portion of blade 16 projecting outwardly from beneath end 32 and sides 24, 26 will be of a radial length exactly equal to the desired depth of cut.

In the operation of saw 10, therefore, arcuate end 32 and side edges 24, 26 of support plate 12 all constitute guide means that may be interchangeably employed, without interrupting operation of the saw, to guide and limit the cut of blade 16. Thus, in the illustrative usage of saw 10 shown in FIGURE 3, the abutment of side edge 24 of support plate 12 with baseboard B has guided and limited the cut of blade 16 as saw 10 was moved (from left to right, as indicated by the arrow) along the greater length of the baseboard. In the confined corner area defined by the intersection of baseboard B with baseboard B', the cut of blade 16 is guided and limited by abutment of arcuate end 16 with the baseboards, which abutment occurs as movement of saw 10 to the right continues. The undercutting of baseboard B', which at this point is already transpiring, may then be continued without interruption or delay simply by moving saw 10 along the floor adjacent thereto while maintaining either arcuate end 32 or side edge 26 in abutment therewith, abutment of the latter with baseboard B' being achieved, if desired, simply by pivotal movement of the saw. Similarly, after saw 10 has been moved in the course of its operation a sufficient distance from the corner area, it may be pivoted in a reverse direction so as to position side 24 in abutment with baseboard B', the undercutting of baseboard B' continuing without interruption during this pivotal movement and then subsequently being conducted in the same manner as that of baseboard B.

This capability of saw 10 to be situated in a variety of angular positions relative to the woodwork being undercut, which capability is attributable to side edges 24, 26 and arcuate end 32 all being interchangeably usable to guide and limit the cut of blade 16, permits its manipulation and ready use in confined or obstructed areas where otherwise it could not be employed at all or could be employed only without the benefit of guide means. Further contributing to the ease of operation of saw 10 in confined areas is the heretofore noted mounting of its electric motor 18 in laterally spaced or offset relation to blade 16. Thus, it will be appreciated that if motor 18 were mounted directly above blade 16, in the more conventional fashion, operation of saw 10 in a corner area such as illustrated in FIGURE 3 might be impeded by abutment of the motor with the baseboards B, B' or the walls thereabove. Similarly, the laterally offset mounting of motor 18 permits use of saw 10 in an area, such as might be encountered upon a cabinet top, where the clearance above the woodwork being undercut is greater than the length of spindle 48 but less than the height of motor 18. It will further be noted that the mounting of motor 18 directly above base plate 14 affords saw 10 a greater stability that markedly decreases the possibility, which would constitute a strong probability if motor 18 were mounted directly above blade 16, of the saw being inadvertently tilted while in use such that blade 16 contacts the floor therebeneath. The avoidance of such contact is, of course, greatly to be desired.

Variation of the depth of cut realized by saw 10 is achieved, as noted heretofore, by substitution of another blade of different diameter for the blade 16 shown, removal of the latter being easily effected merely by removal of screws 54. Similarly, should it be desired to vary the distance above the floor at which blade 16 engages the woodwork, this can be quickly and easily realized merely by inserting shims or the like between support plate 12 and base plate 14, after first loosening screws 38. Alternatively, this same result can be accomplished merely by substituting another base plate of different height for the base plate 14 shown.

In the drawings and specification there has been set forth a preferred embodiment of the invention and, although specific terms are employed, they are used in a generic and descriptive sense only and not for purposes of limitation, the scope of the invention being defined in the claims.

I claim:
1. A portable saw for undercutting woodwork adjacent to a floor or the like and comprising:
 (a) a base plate having a substantially planar lower surface adapted to be positioned upon and moved along the floor;
 (b) an elongate support plate detachably mounted in cantilever fashion upon said base plate with one end of said support plate being laterally offset from said base plate and the other end of said support plate being in vertical alinement with said base plate, said one end of said support plate being arcuate and the side edges of said support plate adjacent said arcuate end converging thereto and merging tangentially therewith, with the angle defined between said side edges being approximately fifty degrees; and said support plate having a vertical bore extending through the center of curvature of said arcuate end thereof;
 (c) a rotatable spindle mounted within said bore and having a lower end portion projecting therefrom below said support plate;
 (d) a circular saw blade mounted upon said lower end portion of said spindle and having a portion extending outwardly from beneath said arcuate end and said side edges of said support plate for undercutting the woodwork, said arcuate end and said side edges of said support plate being adapted to abut the woodwork and thereby guide and limit the cut of said saw blade;
 (e) an electric motor mounted upon said support plate adjacent said other end thereof and in laterally offset relation to said saw blade;

(f) handle means upon said motor for grasping and manipulating the saw; and (g) flexible belting interconnecting said motor and said spindle for rotating said saw blade while said motor is in operation.

2. A portable saw as in claim 1, and further including a sleeve carried by said support plate, and bearing means within said sleeve, said bearing means being in axial alinement with said bore and mounting said spindle within said bore.

References Cited in the file of this patent

UNITED STATES PATENTS

| | | |
|---|---|---|
| 1,135,714 | Pavelske et al. | Apr. 13, 1915 |
| 1,378,259 | Meaker et al. | May 17, 1921 |
| 1,505,947 | Chapman | Aug. 26, 1924 |
| 1,559,926 | Adair | Nov. 3, 1925 |
| 1,763,730 | Von Lackum | June 17, 1930 |
| 2,610,658 | Koeling | Sept. 16, 1952 |
| 2,952,281 | Weber | Sept. 13, 1960 |